F. E. CASE.
MOTOR CONTROL SYSTEM.
APPLICATION FILED DEC. 4, 1911.

1,037,435.

Patented Sept. 3, 1912.

Witnesses:
Adolph Grimm
J. Ellis Glen

Inventor:
Frank E. Case,
by: Albert G. Davis
His Attorney.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

MOTOR-CONTROL SYSTEM.

1,037,435.  Specification of Letters Patent.  Patented Sept. 3, 1912.

Application filed December 4, 1911. Serial No. 663,733.

*To all whom it may concern:*

Be it known that I, FRANK E. CASE, a citizen of the United States, residing at Schenectady, county of Schenectady, State of New York, have invented certain new and useful Improvements in Motor-Control Systems, of which the following is a specification.

This invention relates to the control of electric motors and has particular reference to what is known as the series parallel systems of motor control. More specifically my invention relates to a series parallel system of motor control used in connection with a storage battery as a source of power.

One of the objects of my invention is to provide such a system in connection with a storage battery in which the change can be made from the series to the parallel connection in a simple manner and with a minimum number of controller contacts.

In carrying out my invention I make a permanent connection from one side of the storage battery to one of the motor armatures and continue this permanent connection through the field of this first motor and through the starting resistance and the field of the second motor to the armature of the second motor successively. I then provide a controller so arranged that upon starting, the armature of the second motor is connected with the opposite side of the storage battery. By further movement of the controller the starting resistance is cut out and the connection with the second motor armature is shifted to an intermediate point of the resistance. For full parallel running, connection is also made between the outside brushes of the two motors. With this arrangement the connections of the first motor, the resistance, and the field of the second motor are all permanent, the only connection it is necessary to break being the one connection of the second motor armature.

Figure 1:
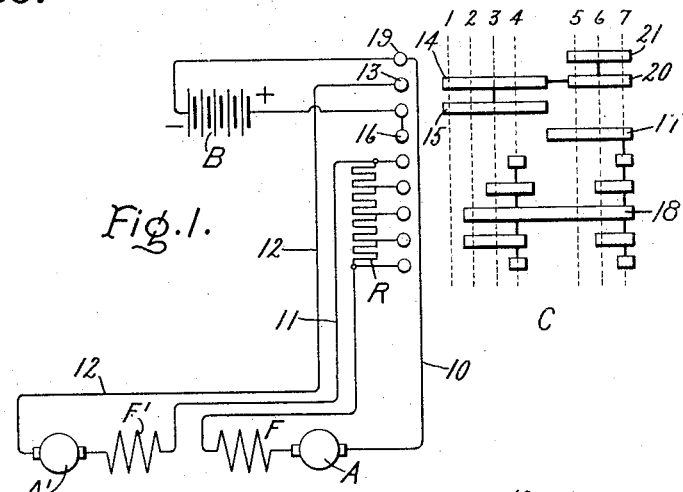

In the accompanying drawing illustrating my invention, Figure 1 is a diagrammatic representation of my motor control equipment shown associated with the controller for changing the connections, and Figs. 2 to 6 inclusive show the connections which are made in the various positions of the controller.

Figure 2:
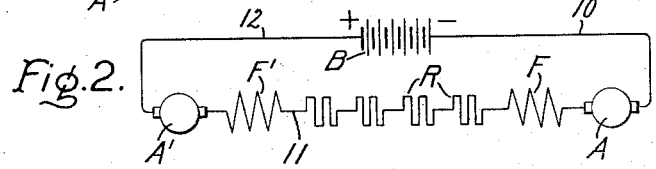
Figure 3:
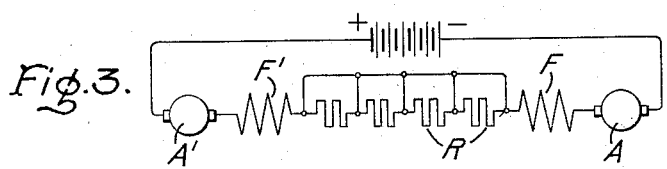
Figure 4:
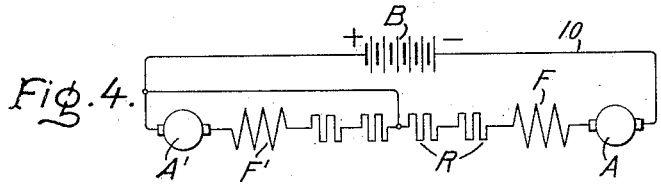
Figure 5:
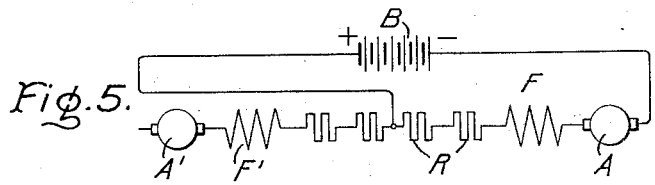
Figure 6:

Referring first to Fig. 1, A represents the armature and F the series field of the first motor, while A' represents the armature and F' the series field of the second motor. B represents a storage battery and R a starting resistance. C represents a controller having seven regular positions and two transient positions for making the various connections. Referring to Fig. 1, it will be seen that when the controller is moved to the first position the connections will be as shown in Fig. 2, that is, there will be a permanent connection from the negative side of the battery through conductor 10 to the armature A, field F, resistance R, conductor 11, field F', armature A', conductor 12 to contact 13. From this point the circuit is completed through the segments 14 and 15 to the positive side of the battery. When the controller is moved further the resistance R is gradually cut out until the controller reaches the fourth position when the connections will be as shown in Fig. 3, in which the resistance is short circuited. Between the fourth and fifth positions are two transition positions represented by the connections shown in Figs. 4 and 5. The first transition occurs when the contact 16 engages segment 17 so that the connection is made from conductor 10 to armature A, field F, and half of the resistance R to segment 18, thence to segment 17 and contact 16 back to the positive side of the battery. The next transition step occurs when the contact 13 leaves the segment 14 thereby breaking the connection of armature A', as shown in Fig. 5. When the controller is moved to the fifth regular position, the contacts 13 and 19 engage with the contacts 20 and 21, respectively, so that the connections will be as shown in Fig. 6. By referring to Fig. 1 it will be seen that these connections are from the negative side of the battery to contact 21, thence through two paths, one of which is through conductor 10, armature A, field F, half of resistance R to segment 18, thence to segment 17, and contact 16 back to the positive side of the battery, while the other path is from the negative side of the battery to segments 21, 20 and contact 13, conductor 12, armature A', field F', half of resistance R, to segment 18, thence to segment 17 and back to the positive side of the battery. In this position the motors are in full parallel with half of the resistance in series with each other. When the controller is now moved to the sixth and seventh positions the resistance is cut out in a well known manner so that the motors will be in full parallel running position.

It will be seen that by my arrangement I have greatly simplified the connections and contacts necessary for bringing the motors through the various steps from series to parallel and cutting out the starting resistance, and while I have described my invention as embodied in concrete form for purposes of illustration it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. In a series parallel system of motor control, in combination, a storage battery, a pair of motors having their fields connected between the armatures and a resistance connected between the fields, a permanent connection from one side of the battery to one of said armatures, and means for connecting the opposite side of the battery either to the other armature or the resistance.

2. In a series parallel system of motor control, in combination, a storage battery, a pair of motors, a starting resistance for said motors, a permanent connection from one side of the battery to one of the motor armatures and thence in series through the field of said motor, the starting resistance, the field and armature of the second motor successively, and means for connecting the opposite side of the battery either to the armature of the second motor or to an intermediate point of the resistance.

3. In a series parallel system of motor control, in combination, a storage battery, a pair of motors, a permanent connection from one side of the battery to one of the motor armatures and thence in series through the field of said motor and the field and armature of the second motor successively, and means for connecting the opposite side of the battery either to the armature of the second motor or to a point between the fields of the motors.

4. In a series parallel system of motor control, in combination, a storage battery, a pair of motors, a permanent connection from one side of the battery to one of the motor armatures and thence in series through the field of said motor and the field and armature of the second motor successively, and a controller arranged to connect the opposite side of the battery with the armature of the second motor for starting and to then connect it to a point between the motor fields and establish a direct connection between the motor armatures for parallel running.

5. In a series parallel system of motor control, in combination, a storage battery, a pair of motors, a resistance, a permanent connection from one side of the battery to one of the motor armatures and thence in series through the field of said motor, the resistance, and the field and armature of the second motor successively, and a controller arranged to connect the opposite side of the battery with the armature of the second motor and gradually cut out the resistance for starting, and then connect the last mentioned side of the battery to an intermediate point on the resistance and establish a circuit connection between the motor armatures for parallel running.

In witness whereof, I have hereunto set my hand this 2nd day of December, 1911.

FRANK E. CASE.

Witnesses:
BENJAMIN B. HULL,
HELEN ORFORD.

Copies of this patent may be obtained for five cents each, by addressing the "Commissioner of Patents, Washington, D. C."